US008523201B2

(12) United States Patent
Allen

(10) Patent No.: US 8,523,201 B2
(45) Date of Patent: Sep. 3, 2013

(54) RETRACTABLE DEVICE AND UTILITY CASE

(76) Inventor: Paul Elijah Allen, Antioch, TN (US)

( * ) Notice: Subject to any disclaimer, the term of this patent is extended or adjusted under 35 U.S.C. 154(b) by 883 days.

(21) Appl. No.: 12/546,879

(22) Filed: Aug. 25, 2009

(65) Prior Publication Data

US 2010/0051488 A1 Mar. 4, 2010

Related U.S. Application Data

(60) Provisional application No. 61/092,028, filed on Aug. 26, 2008.

(51) Int. Cl.
*B62B 3/02* (2006.01)

(52) U.S. Cl.
USPC ........................ 280/79.2; 280/47.35; 206/314

(58) Field of Classification Search
USPC ........................ 280/79.2, 47.35; 206/314, 14
See application file for complete search history.

(56) References Cited

U.S. PATENT DOCUMENTS 3,188,046 A 6/1965 Cervenka
3,376,046 A * 4/1968 Kivett et al. ............. 280/33.998
3,664,224 A 5/1972 Campagna, Jr.
3,765,633 A 10/1973 Caudill
3,891,230 A * 6/1975 Mayer ........................ 280/43.24
4,084,778 A * 4/1978 Dominguez .................. 248/314
4,118,048 A * 10/1978 Spranger et al. ........... 280/47.35
4,147,254 A 4/1979 Bruce
D253,229 S * 10/1979 Spranger et al. ............... D34/19
4,223,785 A 9/1980 Jacques
4,345,732 A * 8/1982 Gallegos ....................... 248/201
4,378,881 A 4/1983 de Vries
4,474,290 A 10/1984 DeMato
4,738,180 A 4/1988 McKnight
4,843,624 A 6/1989 Rashak
4,991,809 A * 2/1991 Harkey .................... 248/229.12
5,240,264 A * 8/1993 Williams ........................ 280/40
5,427,394 A * 6/1995 Lauto ......................... 280/47.35
5,482,162 A * 1/1996 Dickinson ..................... 206/373
5,513,066 A * 4/1996 Berman ........................ 361/625
5,528,453 A 6/1996 Berman et al.
5,590,771 A 1/1997 Cota
5,664,652 A * 9/1997 Shamah ...................... 190/18 A
5,833,051 A 11/1998 Tiefenbrun et al.
6,005,176 A * 12/1999 Yu .................................. 84/327
6,176,559 B1 * 1/2001 Tiramani et al. .............. 312/108
6,296,213 B1 10/2001 Law, III et al.
6,347,847 B1 * 2/2002 Tiramani et al. .............. 312/108
6,462,260 B2 10/2002 Fediakov
6,601,930 B2 * 8/2003 Tiramani et al. .............. 312/108
6,951,280 B1 10/2005 Lee
6,983,946 B2 * 1/2006 Sullivan et al. ........... 280/79.11
7,208,666 B2 4/2007 Burch et al.
7,360,784 B2 * 4/2008 Stewart et al. ................ 280/656
7,503,569 B2 * 3/2009 Duvigneau ................ 280/47.18

(Continued)

*Primary Examiner* — Jeffrey J Restifo
(74) *Attorney, Agent, or Firm* — James Addison Barry, Jr.

(57) ABSTRACT

The retractable stand device may include an upper device 161, a top device 171, and a lower device 181 that may hold a musical instrument such as a guitar. In addition, the retractable stand device may be in combination with a utility case 100 or it may be a kit with installation hardware. The utility case 100 may include a hinged lid 122 for access to an upper compartment 120, a base 140 for amplifiers, fixed compartments 130, movable compartments 128, handles 118, and wheels 142. Numerous combinations of stand devices and utility case options are included.

9 Claims, 7 Drawing Sheets

(56) References Cited

U.S. PATENT DOCUMENTS

| | | | | |
|---|---|---|---|---|
| 7,541,529 | B1 * | 6/2009 | Blair | 84/327 |
| 7,883,096 | B2 * | 2/2011 | Katz et al. | 280/47.26 |
| 7,938,412 | B2 * | 5/2011 | Katz | 280/47.34 |
| 8,020,704 | B2 * | 9/2011 | Houle | 206/577 |
| 8,063,291 | B2 * | 11/2011 | Crowder et al. | 84/327 |
| 8,087,513 | B2 * | 1/2012 | Kriesel | 206/314 |
| D653,832 | S * | 2/2012 | Vilkomirski et al. | D34/25 |
| 8,132,819 | B2 * | 3/2012 | Landau et al. | 280/47.26 |
| 2004/0007117 | A1 | 1/2004 | Howard, Sr. | |
| 2007/0158509 | A1 * | 7/2007 | Hubbell | 248/171 |
| 2007/0164524 | A1 * | 7/2007 | Chen | 280/33.998 |
| 2010/0051488 | A1 * | 3/2010 | Allen | 206/314 |

* cited by examiner

RETRACTABLE DEVICE AND UTILITY CASE

CROSS-REFERENCE

This application claims the benefit of U.S. Provisional Application Ser. No. 61/092,028, filed Aug. 26, 2008, titled Utility Case For Musical Instrument Applications. The present application is related by the same inventor for all applications; Paul Elijah Allen. The U.S. Provisional Application Ser. No. 61/092,028, filed Aug. 26, 2008, titled Utility Case For Musical Instrument Applications is hereby incorporated in its entirety by reference.

FIELD OF INVENTION

The present invention relates to the field of a device for holding and protecting musical instruments that may be used in combination with a utility case. The utility case with an upper compartment may have numerous unique combinations of utility case and retractable devices.

BACKGROUND OF INVENTION

There is a need for a more efficient device for holding musical instruments even though many have been attempted. There is also a need for better utility cases for transporting musical instruments and equipment for many years as evidenced by the numerous U.S. patents issued in this area. In addition, there is a need for a combination of a device for holding musical instruments and a utility case for transporting musical equipment.

SUMMARY

A retractable device includes an upper device comprising an upper u-shaped member with an open end; a means for locking the upper device in at least one position; a means for moving the upper u-shaped member between an upper retracted position and an upper extended position; and the upper device is attachable with an approximately vertical object. The retractable device may further include a lower device including an elongated frame wherein the elongated frame further comprises a rubber coating with the elongated frame for protecting a musical instrument from damage and for securing the musical instrument on the lower device; a means for locking the elongated frame member in position; a means for moving the elongated frame between a lower retracted position and a lower extended position; and the lower device is attachable with the approximately vertical object.

A retractable stand device for holding a musical instrument comprising a top device attachable with an approximately horizontal object for holding a neck of a musical instrument secure on a top surface for working on the musical instrument, the top device comprising a top u-shaped member hinged for extending and holding the neck of the musical instrument, and a pivot point for rotating from a horizontal retracted position to a vertical extended position wherein the pivot point further comprises a locking means such that the top u-shaped member may be held in the extended position by moving the top u-shaped member into a locked position, and a retraction means to retract the top u-shaped member when not locked in the extended position.

A retractable device includes an upper device comprising an upper u-shaped member with an open end; a means for locking the upper u-shaped member in at least one position; a means for moving the upper u-shaped member between an upper retracted position and an upper extended position; and the upper device is attachable with a an approximately vertical object. The retractable device may further include a lower device including an elongated frame member wherein the lower device further comprises a rubber coating with the elongated frame member for protecting a musical instrument from damage and for securing the musical instrument on the lower device; a means for locking the elongated frame member in position; a means for moving the elongated frame member between a lower retracted position and a lower extended position; and the lower device is attachable with the approximately vertical object in combination with a utility case, the utility case comprising: a base, and a cover wherein the cover comprises at least one cover side and a cover top, wherein the cover is attachable with the base for transporting the utility case; wherein the at least one cover side of the utility case is the approximately vertical object wherein the upper device and the lower device are attached.

A utility case including a base, an upper compartment, and a cover in which the cover comprises at least one cover side and a cover top, in which the cover is attached with the base for transporting the utility case, in which the cover further comprises a lid in an upper portion of the cover in which the lid is hinged with the cover for access to the upper compartment formed in the upper portion of the cover below the hinged lid, in which the upper compartment further includes at least two movable compartments within the upper compartment that may be adjusted in size to meet the size of the equipment and devices to be placed in the movable compartments, and foam cushion lining for protection of delicate equipment, in which the utility case further includes handles for lifting the utility case, and wheels for moving the case.

BRIEF DESCRIPTION OF THE DRAWINGS

The features, aspects, and advantages of the invention will become better understood with regard to the following description, appended claims, and accompanying drawings where:

DETAILED DESCRIPTION OF THE INVENTION

Figure 1:
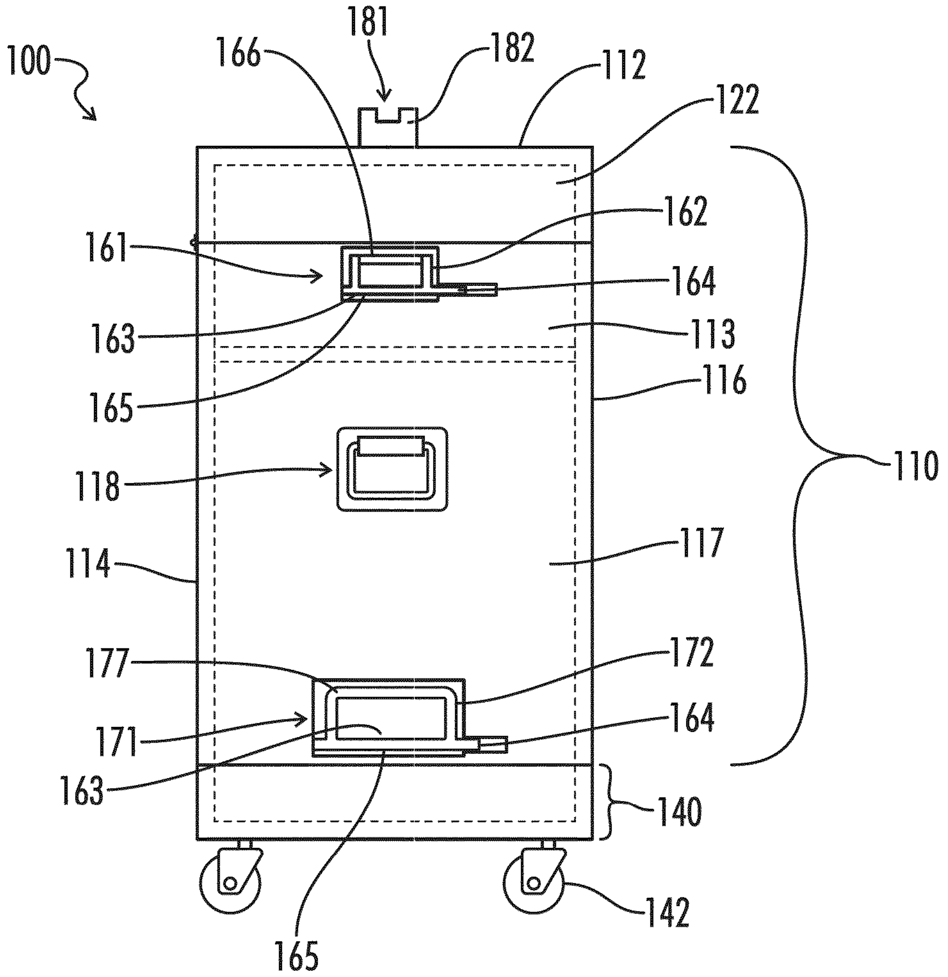
FIG. 1 is a side view of one embodiment of a utility case.

The present invention relates to the field of a device for securing and protecting musical instruments that may be used in combination with a utility case. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

Overview:

As illustrated in FIGS. 1 through 8, a retractable stand device may comprise a combination of an upper device 161, a lower device 171, and a top device 181 that support, hold, or secure a musical instrument such as a guitar. For stability these retractable stand devices may be attached with a vertical object and or a horizontal object. The vertical or horizontal objects include many objects such as a utility case 100, a wall, and a table but are not limited to these objects. A upper u-shaped member 162, elongated frame member 172, and top u-shaped member 182 are retractable and may be locked in the extended or retracted position and the devices have a means for moving between the extended and retracted positions. The retractable stand device may be in combination with a utility case 100 or it may be a kit with installation hardware. The utility case 100 may include a cover 110, a hinged lid 122 for access to an upper compartment 120, a base 140 for amplifiers, fixed compartments 130, movable compartments 128, handles 118, and wheels 142. Numerous combinations of retractable stand device and vertical and horizontal object combinations including a utility case option are included.

Design Specifications:

The Retractable Stand Device

FIGS. 1, 2, 2A, 2B, 3, 6, 7, and 8 illustrate retractable stand devices attached with a utility case 100 on a side or top of a cover 110. One such retractable stand device is an upper device 161 in which the upper device 161 includes an upper u-shaped member 162 with an open end, a means for moving the upper u-shaped member 162 between an upper retracted position and an upper extended position, and a means for locking the upper device 161 in the extended or the retracted position, wherein the upper device 161 is attachable with an approximately vertical object. The upper u-shaped member 162 allows a neck of a musical instrument to rest in a u-shape 167 wherein the u-shape 167 helps to secure the musical instrument for protecting and restraining the musical instrument on the stand devices. The upper u-shaped member 162 may have the u-shaped opening to open toward the left, right, or center when the upper u-shaped member 162 is extended horizontally. The upper device 161 may further comprise a means for securing the neck of the musical instrument in the open end of the upper u-shaped member 162. The means for securing the neck of the musical instrument may include a spring loaded bar 166 wherein the spring loaded bar 166 pivots 168 over the open end of the upper device u-shaped member 162 to allow the upper u-shaped member 162 to receive the neck of the musical instrument and to remove the neck of the musical instrument from the upper u-shaped member 162. The spring loaded bar 166 may be spring loaded to return to close the open end of the upper u-shaped member 162 and thereby hold the musical instrument in position.

Figure 2:
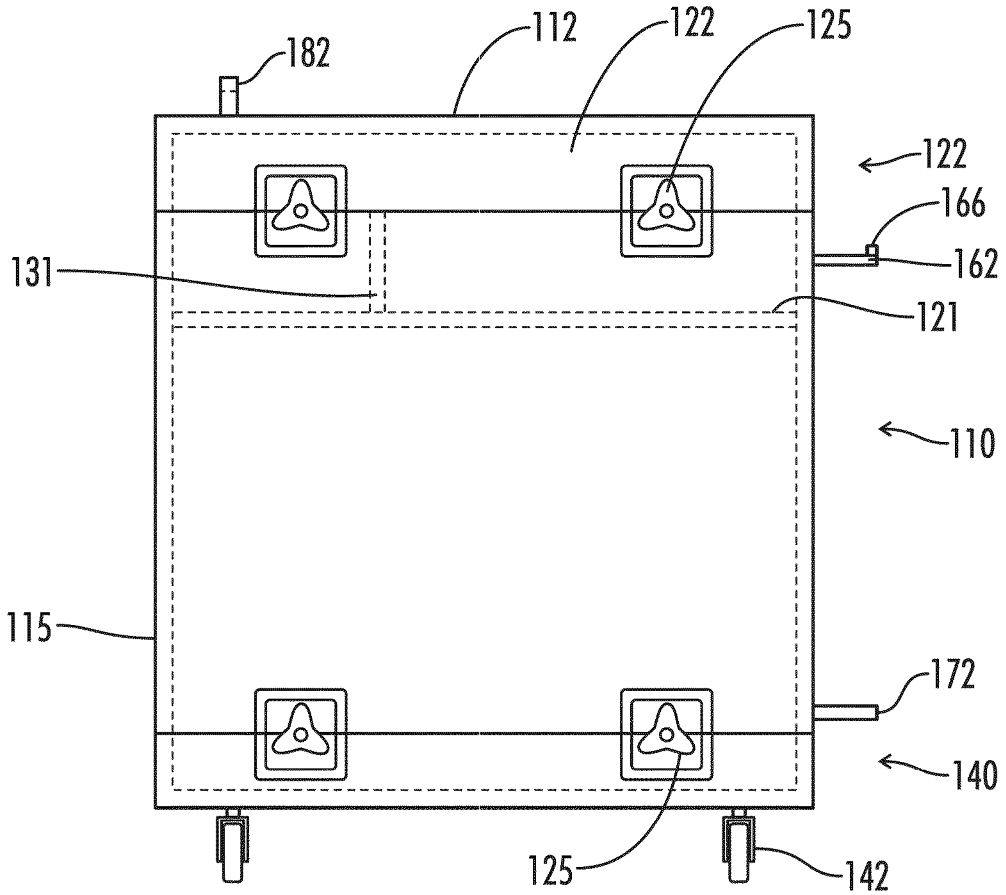
FIG. 2 is a front view of one embodiment a utility case depicting a top device in an extended vertical position.
Figure 2A:
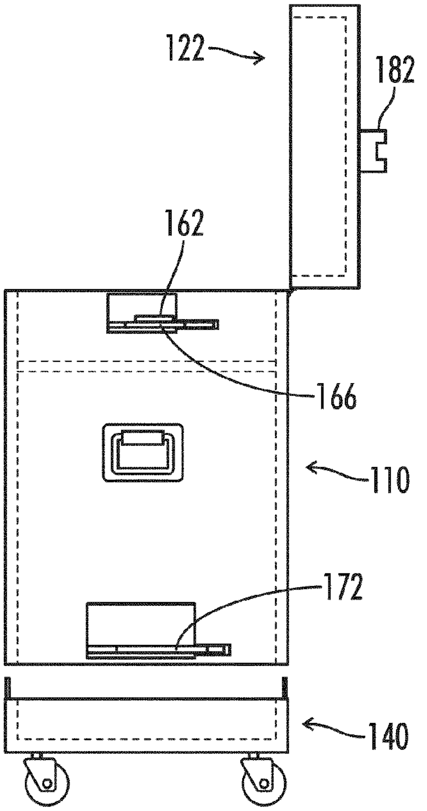
FIG. 2A is a side view of FIG. 2 with the lid opened.
Figure 2B:
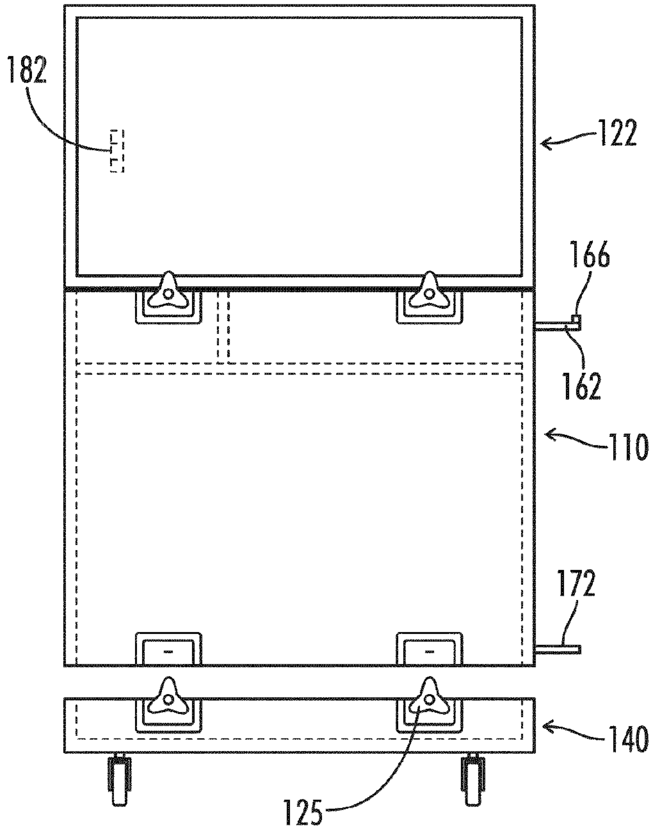
FIG. 2B is a front view of FIG. 2 with the lid opened.
Figure 3:
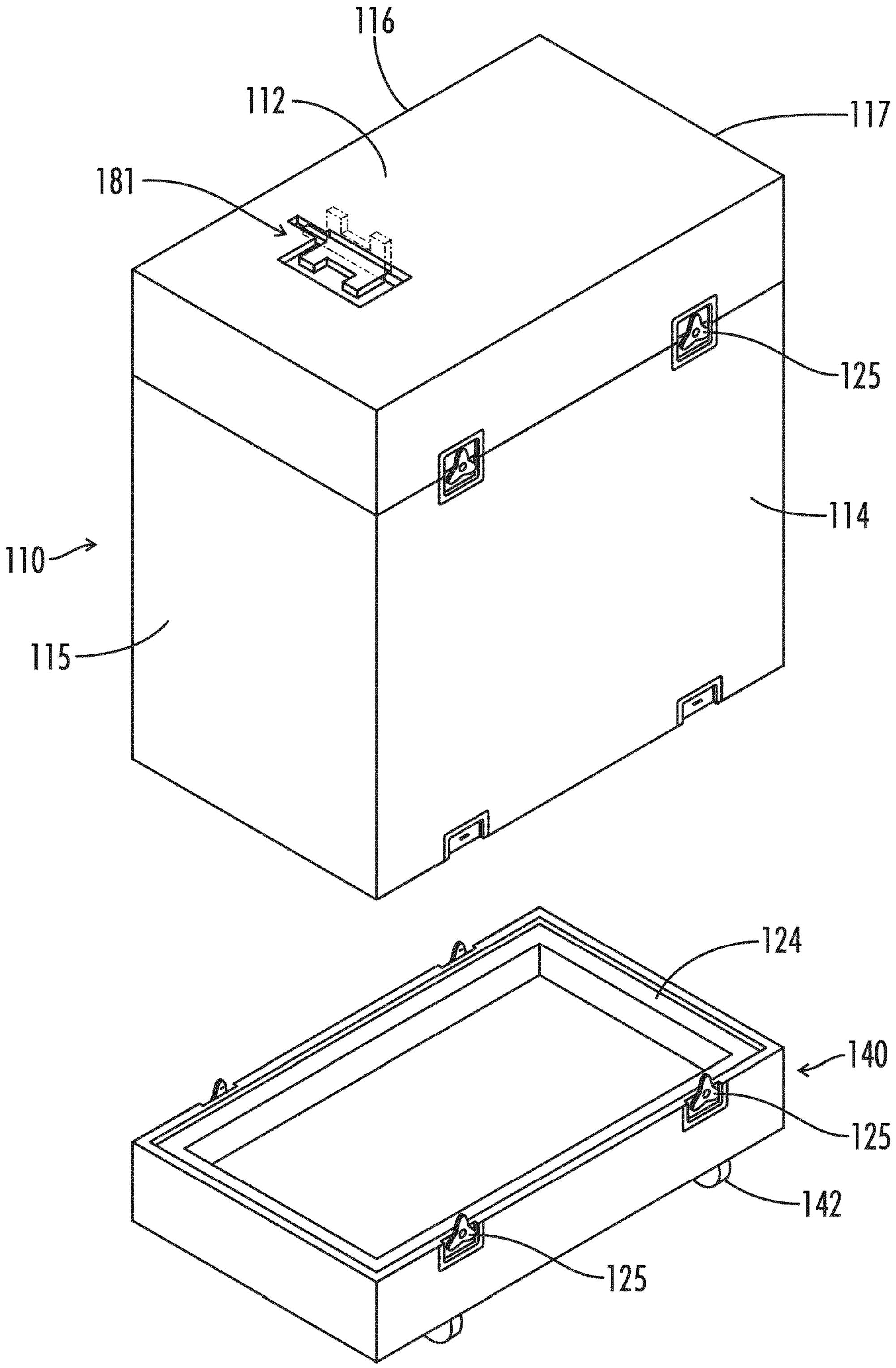
FIG. 3 is an upper front perspective view of one embodiment of a utility case with a cover removed from a base.
Figure 4:
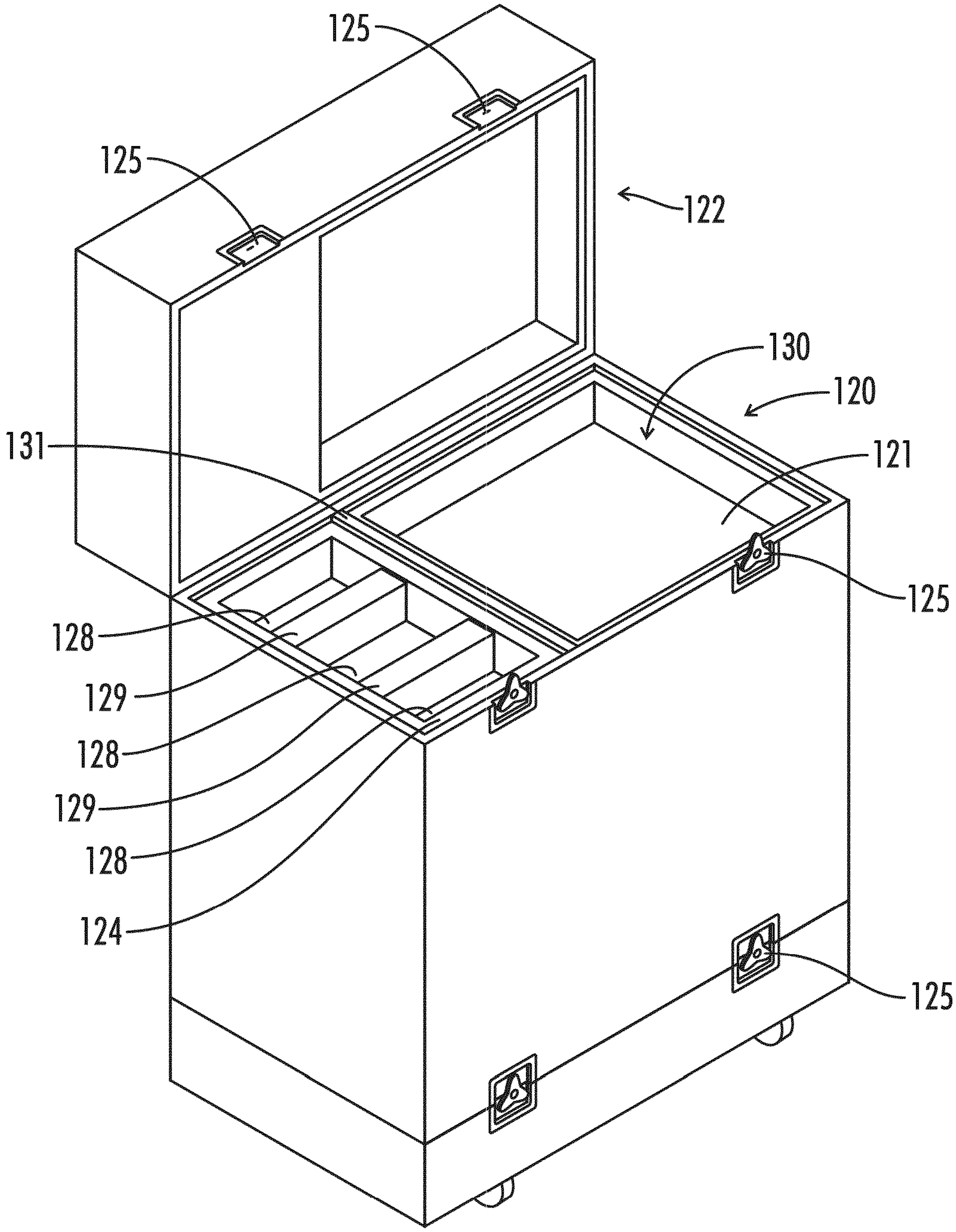
FIG. 4 is an upper front perspective view of an embodiment of a utility case with a lid raised allowing access to an upper compartment.
Figure 5:
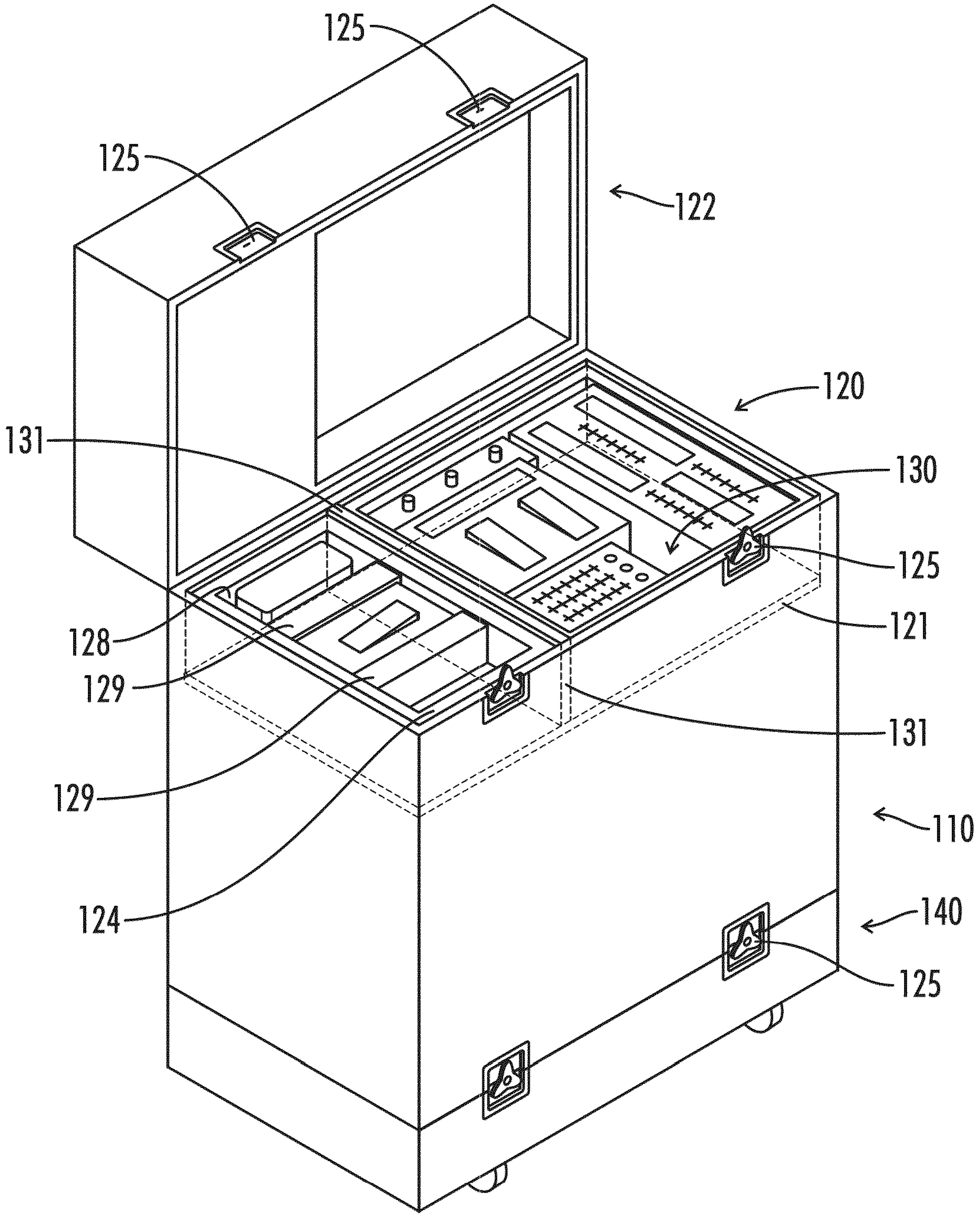
FIG. 5 is an upper front perspective view of an embodiment of a utility case with a lid raised allowing access to an upper compartment illustrating equipment stowed in the upper compartment.
Figure 6:
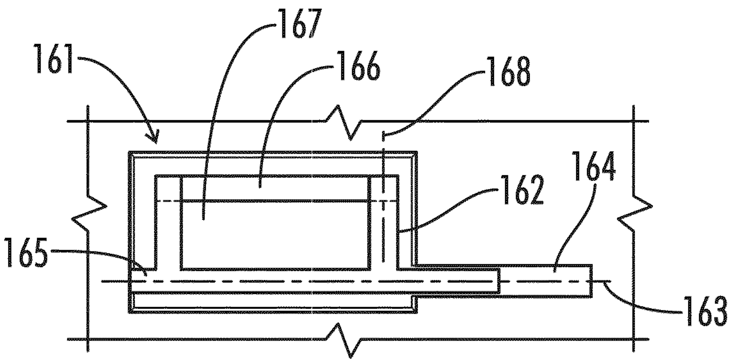
FIG. 6 is an enlarged side view of one embodiment of an upper device.
Figure 7:
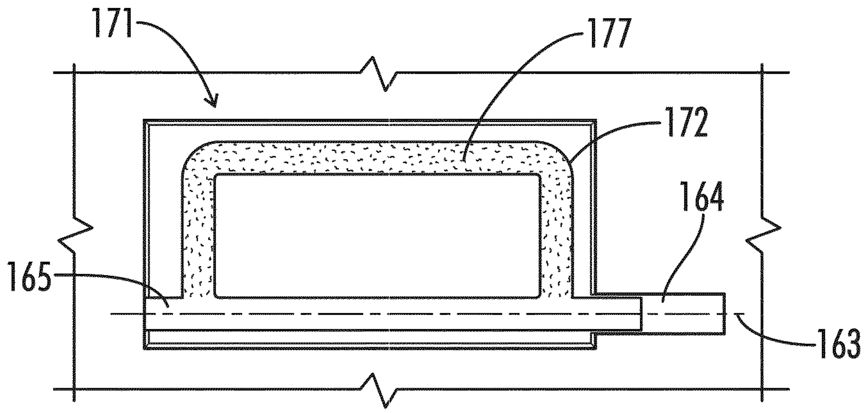
FIG. 7 is an enlarged side view of one embodiment of a lower device.
Figure 8:
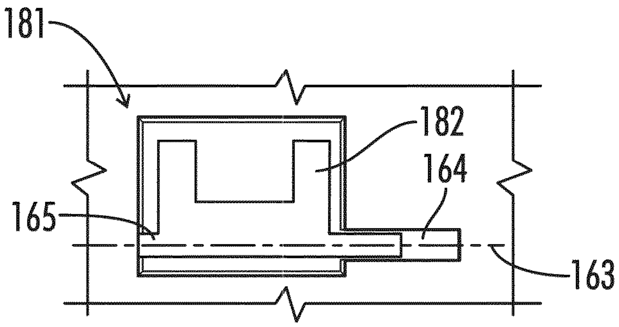
FIG. 8 is an enlarged top view of one embodiment of a top device.

The upper device 161 may be used without the assistance of a lower device 171 to hold the musical instrument in place. However, a retractable stand device that includes the upper device 161 would typically include the lower device 171. The lower device 171 comprises an elongated frame member 172, normally a length of material bent to form the elongated frame member 172; a means for locking the lower device 171 in position; a means for moving the elongated frame member 172 between a lower retracted position and a lower extended position; and the lower device 171 is attachable with an approximately vertical object. The lower device 171 elongated frame or rectangular shaped member 172 may also include a rod or tube shaped in a rectangular shape 172. The lower member 171 may further comprise a rubber coating 177 with the elongated frame member 172 for protecting the musical instrument, especially the lower bout when the musical instrument is a guitar, from damage and to help secure the musical instrument on the lower device 171. The lower device 171 is attachable with an approximately vertical object that may include a utility cover as depicted in FIGS. 1, 2, and 7. In this embodiment the lower device 171 typically is on the same side of the cover 110 as the upper device 161 and located below the upper device 161. The lower device 171 may be positioned in relation to the upper device 161 such that the base of the musical instrument rests on the lower device 171 and the upper device 161 is positioned above the lower device 171 at a height that would effectively secure the neck of the musical instrument in the upper device 161. Several upper and lower devices 161, 171 may be spaced around a utility case 100.

The retractable stand device may further include a top device 181. The top device 181 comprises a top u-shaped member 182 with an open end; a means for moving the top u-shaped member 182 between a top retracted position and a top extended position; a means for locking the top device 181 in the top extended and or top retracted position; and the top device 181 is attachable with an approximately horizontal object as shown in FIGS. 1, 2, 2A, 2B, 3, and 8. The top device 181 may be used for holding a neck of a musical instrument secure on the top of a horizontal object such as the top of a utility case 100 while working on the musical instrument. The top u-shaped member 182 may be hinged for extending and holding the neck of a musical instrument, and include a pivot point 163 for rotating between the horizontal retracted position and the vertical extended position. The top u-shaped member 182 may open upward when the top u-shaped member 182 is extended in the vertical position. The top device 181 may include a retractions means 165. The upper and top u-shaped members 162, 182 may be manufactured such that they are interchangeable. In this embodiment the upper device 161 may be attached with a horizontal object to function as a top device 181 and the top device 181 may be attached with a vertical object to function as an upper device 161. In addition, the upper and top u-shaped members 162, 182 may also include a cushion protective substance 177 wherein the musical instrument neck is protected when resting in the u-shaped member 162, 182.

Means for Moving:

The upper device 161, the lower device 171, and the top device 181 include a means for moving that may comprise a pivot point 163 for rotating or moving between the retracted position and the extended position. The means for moving the upper u-shaped member 162 between an upper retracted position and an upper extended position; the means for moving the elongated frame member 172 between a lower retracted position and a lower extended position; or the means for moving the top u-shaped member 182 between a top retracted position and a top extended position may include but are not limited to any combination of: gravity, a pivot point with a spring, or a physical movement by the user. In addition, the upper device 161 may include a retraction means 165 to retract the upper u-shaped member 162 when the upper u-shaped member 162 is not locked in the extended position.

The means for moving may comprise a retraction means 165 that may include a spring mechanism that retracts the upper u-shaped member 162 to a retracted position whenever there is not a force present to restrict movement of the upper u-shaped member 162 from the retracted position or a force to hold the upper u-shaped member 162 away from the retracted position. The lower device 171 may include an elongated frame or a rectangular shaped member 172 with a pivot point 163 for rotating from the retracted position to the extended position. The lower device 171 may also include a retraction means 165 to retract the elongated frame member 172 when a force is not applied to hold elongated frame member 172 in the extended position or a force to hold the elongated frame member 172 in the retracted position. The top device 181 may include a top u-shaped member 182 hinged for extending and holding the neck of a musical instrument, a pivot point 163 for rotating from the horizontal retracted position to the vertical extended position and the top device 181 may further comprise a retraction means for retracting the top u-shaped member 182 when the top u-shaped member 182 is not locked in the extended position. The top u-shaped member 182 opens upward when the top u-shaped member 182 is extended in the vertical position. The top device 181 may include a retractions means 165.

Means for Locking:

The upper device 161, the lower device 171, or the top device 181 include a means for locking wherein a pivot point 163 may cooperate with a locking means 164 such that the upper u-shaped member 162, the elongated frame member 172, or the top u-shaped member 182 may be held in the extended position. One locking means may include a notch 164 wherein the upper u-shaped member 162, the elongated frame member 172, or the top u-shaped member 182 with the pivot point 163 may be positioned by moving or sliding the upper u-shaped member 162, the elongated frame member 172, or the top u-shaped member 182 into a locked position by sliding the upper u-shaped member 162, the elongated frame member 172, or the top u-shaped member 182 left or right into the notch 164 while the upper u-shaped member 162, the elongated frame member 172, or the top u-shaped member 182 is in the extended position. The notch 164 restrains the upper u-shaped member 162, the elongated frame member 172, or the top u-shaped member 182 from returning to the retracted position. The upper device 161, and the lower device 171 may be attached with the approximately vertical object such that the pivot point 163 is above the upper u-shaped member 162 or the elongated frame member 172 such that gravity would retract the member when the member is not locked in the extended position. The upper, lower, and top devices 161, 171, 181 may include a stop with the means to move between the extended and the retracted position such that the movement is limited to approximately ninety degrees. The utility case 100 handle 118 may have a stop such that as the user lifts the handle 118 it stops at approximately ninety degrees thus the handle 118 is rotated to an extended position defined by the stop for lifting the utility case 118. The upper and lower devices 161, 171 may use this same principle except lowering the u-shaped member 162 or the elongated frame member 172 approximately ninety degrees to a stop for an extended position instead of raising the u-shaped member 162 or the elongated frame member 172 approximately ninety degrees to the stop as for the handle 118. In some embodiments gravity may hold the member 162, 172, or 182 in the extended position. The top device 181 may use an over-centered stop wherein the top u-shaped member 182 rotates past ninety degrees to maintain the top device 181 in an extended position. In addition, the locking means for preventing movement of the members 162, 172, and 182 may include but is not limited to a clip, snap, slide with notch, and friction between the moving parts of the device 161, 171, 181 for locking the device in the retracted position or the extended position or locking the device between these positions.

The Utility Case:

As illustrated in FIGS. 1 through 5, a combination utility case 100 includes: a cover 110 and a base 140. The cover 110 and the base 140 may be combined with an upper compartment 120 including a lid 122 for access to the upper compartment 120. The cover 110 and base 140 may be combined with a device or devices 161, 171, 181 that extend and retract in relationship with the utility case 100 that may hold a musical instrument such as a guitar stand may hold a guitar. A typical combination utility case 100 may include a utility case 100 combined with an upper device 161 and a lower device 171 on one side of the utility case cover 110 for extending and holding a guitar with the upper and lower device 161, 171. Another combination utility case 100 may include a utility case 100 combined with a top device 181 for holding a guitar in position while working on the guitar such that the instrument may rest on top 112 of the utility case 100 with the top device 181 holding the neck of the guitar in position while adjusting or repairing the guitar. Still another combination may include a utility case 100 combined with an upper compartment 120 in the upper portion of the utility case 100 cover wherein a lid 122 is included with the top 112 of the cover 110 to allow access to the upper compartment 120. A number of different combinations of these elements along with the use of one or more sides as musical instrument stands are envisioned within the metes and bounds of this specification.

The Cover 110:

As depicted in FIGS. 1 through 5, the utility case 100 for musical instrument equipment generally includes two components, a cover 110 and a base 140. The cover 110 includes at least one side 113. Typically, the cover 110 includes a top 112 and four sides, a front side 114, a left side 115, a rear side 116, and a right side 117. The cover 110 may also include an upper compartment 120 in the upper portion of the cover 110. The upper compartment 120 may be formed by addition of an upper compartment floor 121 attached with the upper portion of the cover 110. In addition to one large upper compartment, the upper compartment 120 may be divided into several smaller compartments. These compartments may be adjustable for the size of the equipment to be stowed in the adjustable compartment 128. In the multiple adjustable compartment application, an adjustable wall 129 may be used to adjust the compartment size. The adjustable wall 129 may vary from being able to move a simple piece of foam placed in the desired location to separate the equipment and hold the equipment in place as it is transported, to a more sophisticated snap-in adjustable wall that can be snapped out and snapped into several locations. The upper compartment 120 may also have a fixed size compartment 130 within the upper compartment 120. This fixed size compartment may be desirable in applications where an adjustable size is not needed but a certain size in routinely used for the application. A fixed wall 131 may be secured with fasteners including but not limited to rivets, screws, epoxy, glue, and joints joining the fixed wall 131 and the upper compartment 120 or other fixed walls 131. The upper compartment 120 may also include a combination of both fixed 130 and adjustable compartments 128 in the same embodiment. The fixed or adjustable walls 129, 131, upper compartment 120, and cover 110 may include foam lining 124 for protection of delicate equipment. The top 112 of the cover 110 may include a hinged lid 122 and fasteners 125 for securing the hinged lid 122 in place or releasing the hinged lid 122 to allow the hinged lid 122 to be pivoted open for access to the upper compartment 120. The hinged lid 122 may have a hinge stop to allow only a limited number of degrees of rotation when opening the hinged lid 122. The cover 110 may have at least one handle 118 for moving and/or lifting the utility case 100 and or lifting the cover 110 off of the base 140. The cover 110 and the base 140 may have fasteners 125 to secure the cover 110 with the base 140. The fasteners 125 may be releasable buckle-type fasteners.

The Base 140:

As shown in FIGS. 1 through 5, the base 140 may include fasteners 125 that are releasable for attaching the base 140 with the cover 110. The base 140 may support amplifiers or other larger equipment used with musical instruments. Typically, the base 140 will be foam lined 124 to protect delicate equipment. The base 140 may also have casters or wheels 142 for ease of moving the utility case 100 from one location to another. The base 140 and the cover 110 may be made of durable plastic or aluminum or similar material for durability and light weight.

Upper Compartment with Adjustable and Fixed Foam Lined Compartments:

As depicted in FIGS. 1 through 5, one embodiment may include a utility case 100 and an upper compartment 120 combination wherein the combination comprises: a base 140, and a cover 110 wherein: the cover 110 comprises at least one cover side 113 and a cover top 112, the cover 110 is attached with the base 140 for transportation of the utility case 100, and the cover 110 further comprises a lid 122 in an upper portion of the cover 110 wherein the lid 122 is hinged with the cover 110 for access to the upper compartment 120 formed in the upper portion of the cover 110 below the hinged lid 122, wherein the upper compartment 120 further comprises at least two movable compartments 128 within the upper compartment 120 that may be adjusted in size to meet the size of the equipment and articles to be placed in the movable compartments, and foam cushion lining 124 for protection of delicate equipment, wherein the utility case 100 may further comprise handles 118 for lifting the utility case 100 or the cover 110, and wheels 142 for moving the case 100.

Kit:

As illustrated in FIGS. 1, 2, 6, and 7, one embodiment of the retractable device may comprise a kit including an upper device 161 comprising an upper u-shaped member 162, a pivot point 163 for rotating from the vertical retracted position to the horizontal extended position wherein the pivot point 163 further comprises a locking means 164 such that the upper u-shaped member 162 may be held in an extended position by moving the upper u-shaped member 162 into a locked position, a retraction means 165 to retract the upper u-shaped member 162 when not locked in the extended position; a lower device 171 comprising an elongated frame or a rectangular shaped member 172 with a pivot point 163 for rotating between the vertical retracted position and the horizontal extended position wherein the pivot point 163 further comprises a locking means 164 such that the elongated frame member 172 may be held in the extended position by moving the elongated frame member 172 with the pivot point 163 into a locked position, a retraction means 165 to retract the elongated frame member 172 when not held in the extended position, wherein the lower device elongated frame member 172 may comprise a rod or tube shaped in a rectangular fashion and a rubber coating 177 with the elongated frame member 172 to protect the musical instrument from damage and to secure the musical instrument on the lower device 171; and an assortment of hardware for attaching the upper device 161 and the lower device 171 with the utility case 100.

What is claimed is:

1. A retractable device comprising an upper device comprising:

an upper u-shaped member with an open end;

a means for locking the upper u-shaped member in at least one position;

a means for moving the upper u-shaped member between an upper retracted position and an upper extended position;

wherein the upper device further comprises a means for securing a neck of a musical instrument in the open end of the upper u-shaped member such that the neck of the musical instrument may be received in the upper u-shaped member and the neck of the musical instrument may be removed from the upper u-shaped member, wherein the means for securing the neck of the musical instrument comprises a spring loaded bar that pivots over the open end of the upper u-shaped member wherein the neck of the musical instrument is received in the upper u-shaped member and the neck of the musical instrument is removed from the upper u-shaped member wherein the spring loaded bar is spring loaded to return to close the open end of the upper u-shaped member to secure the musical instrument; and the upper device is attachable with an approximately vertical object.

2. A retractable device comprising an upper device comprising:

an upper u-shaped member with an open end;

a means for locking the upper u-shaped member in at least one position;

a means for moving the upper u-shaped member between an upper retracted position and an upper extended position;

wherein the upper device further comprises a means for securing a neck of a musical instrument in the open end of the upper u-shaped member such that the neck of the musical instrument may be received in the upper u-shaped member and the neck of the musical instrument may be removed from the upper u-shaped member;

the upper device is attachable with an approximately vertical object;

wherein the retractable device further comprises a lower device comprising:

a length of material bent to form an elongated frame member;

a means for locking the elongated frame member in position;

a means for moving the elongated frame member between a lower retracted position and a lower extended position; and the lower device is attachable with the approximately vertical object in combination with a utility case, the utility case comprising:

a base, and a cover wherein the cover comprises at least one cover side and a cover top, wherein the cover is attachable with the base for transporting the utility case; wherein the at least one cover side of the utility case is the approximately vertical object wherein the upper device and the lower device are attached.

3. The combination as set forth in claim 2 further comprising a top device, the top device comprising a top u-shaped member hinged for extending and holding the neck of the musical instrument, and a pivot point for rotating from a horizontal retracted position to a vertical extended position wherein the pivot point further comprises a locking means such that the top u-shaped member ma be held in the extended position by moving the top u-shaped member into a locked position, and a retraction means to retract the top u-shaped member when not locked in the extended position.

4. The combination as set forth in claim 3 wherein the utility case further comprises an upper compartment wherein the cover comprises a lid in an upper portion of the cover wherein the lid is hinged with the cover for access to the upper compartment formed in the upper portion of the cover below the hinged lid; wherein the upper compartment further comprises at least two movable compartments within the upper compartment that may be adjusted in size to meet the size of the equipment and devices to be placed in the movable compartments; and in addition the upper compartment further comprises foam cushion lining for protection of delicate equipment.

5. The combination as set forth in claim 4 wherein the case further comprises handles for lifting the case or the cover, and wheels for moving the case.

6. The combination as set forth in claim 2 wherein the elongated frame member further comprises a rubber coating with the elongated frame member for protecting the musical instrument from damage and for securing the musical instrument on the lower device.

7. A retractable stand device for holding a musical instrument comprising a top device attachable with an approximately horizontal object for holding a neck of a musical instrument secure on a top surface, the top device comprising a top u-shaped member hinged for extending and holding the neck of the musical instrument, and a pivot point for rotating from a horizontal retracted position to an approximately vertical extended position wherein the pivot point further comprises a locking means such that the top u-shaped member may be held in the extended position by moving the top u-shaped member into a locked position, and a retraction means to retract the top u-shaped member when not locked in the extended position in combination with a utility case wherein the utility case includes an approximately vertical object and the approximately horizontal object, and the combination further includes an upper device attachable to the approximately vertical object wherein the upper device comprises an upper u-shaped member with an open end, and a pivot point for rotating from a retracted position to an extended position wherein the pivot point further comprises a locking means such that the upper u-shaped member may be held in the extended position by moving the upper u-shaped member into a locked position, and a retraction means to retract the upper u-shaped member when not locked in the extended position; and wherein the upper device further comprises a spring loaded bar that pivots over the open end of the upper u-shaped member wherein the neck of the musical instrument is received in the upper u-shaped member and the neck of the musical instrument is removed from the upper u-shaped member wherein the spring loaded bar is spring loaded to return to close the open end of the upper u-shaped member to secure the musical instrument.

8. The combination as set forth in claim 7 further including a lower device attachable with the approximately vertical object and aligned under the upper device wherein the lower device comprises an elongated frame member with the pivot point for rotating from the retracted position to the extended position wherein the pivot point further comprises the locking means such that the elongated frame member may be held in the extended position by moving the elongated frame member into the locked position, and the retraction means to retract the elongated frame member when not held in the extended position.

9. The combination as set forth in claim 8 wherein the elongated frame member further comprises a rubber coating, with the elongated frame member to protect the musical instrument from damage and to secure the musical instrument on the lower device.

* * * * *